United States Patent
Onose et al.

(10) Patent No.: US 6,941,815 B2
(45) Date of Patent: Sep. 13, 2005

(54) SENSOR WITH BUILT-IN CIRCUITS AND PRESSURE DETECTOR USING THE SAME

(75) Inventors: Yasuo Onose, Ibaraki-ken (JP); Junichi Horie, Hitachinaka (JP); Seiji Kuryu, Hitachinaka (JP); Akihiko Saito, Hadano (JP); Norio Ichikawa, Mito (JP); Atsuo Watanabe, Hitachiota (JP); Satoshi Shimada, Hitachi (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 10/173,732

(22) Filed: Jun. 19, 2002

(65) Prior Publication Data

US 2002/0157475 A1 Oct. 31, 2002

Related U.S. Application Data

(63) Continuation of application No. 09/501,292, filed on Feb. 9, 2000, now abandoned.

(30) Foreign Application Priority Data

Feb. 9, 1999 (JP) .......................................... 11-030934

(51) Int. Cl.[7] ................................................ G01L 9/04
(52) U.S. Cl. ........................................ 73/726; 257/417
(58) Field of Search ........................ 73/706, 726, 700, 73/754; 257/419, 417, 254

(56) References Cited

U.S. PATENT DOCUMENTS

| | | | |
|---|---|---|---|
| 4,618,397 A * | 10/1986 | Shimizu et al. ............... 438/53 |
| 5,095,349 A * | 3/1992 | Fujii et al. .................... 257/108 |
| 5,145,810 A * | 9/1992 | Matsumi ........................ 438/53 |
| 5,167,158 A * | 12/1992 | Kamachi et al. .............. 73/727 |
| 5,209,119 A * | 5/1993 | Polla et al. .................... 73/723 |
| 5,296,730 A * | 3/1994 | Takano et al. ............... 257/417 |
| 5,320,705 A * | 6/1994 | Fujii et al. .................... 438/51 |
| 5,719,069 A * | 2/1998 | Sparks ........................ 438/50 |
| 6,194,236 B1 * | 2/2001 | Sakai et al. .................... 438/17 |
| 6,218,717 B1 * | 4/2001 | Toyoda et al. ............... 257/419 |
| 6,229,190 B1 * | 5/2001 | Bryzek et al. ............... 257/419 |
| 2002/0149069 A1 * | 10/2002 | Bryzek et al. ............... 257/414 |

FOREIGN PATENT DOCUMENTS

| | | |
|---|---|---|
| DE | 696 24 973 | 8/2003 |
| JP | 62-156879 | 7/1987 |
| JP | 03-229470 | 10/1991 |
| JP | 06-045618 | 2/1994 |
| JP | 10-132684 | 5/1998 |

OTHER PUBLICATIONS

Motorola Semiconductor Application Note, "An Integrated Silicon Bulk Micromachined Barometric Pressure Sensor For Engine Control Unit and External Mount", 1998, pp. 1–8.

* cited by examiner

*Primary Examiner*—William Oen
*Assistant Examiner*—Andre Allen
(74) *Attorney, Agent, or Firm*—Crowell & Moring LLP

(57) ABSTRACT

A sensor with built-in circuits can be improved in the stability of the operation or characteristics. A circuit region and a sensor region are covered by a passivation film. The sensor region is partially covered by the passivation film. The sensor region and circuit region are protected by the passivation film, and an effect of the passivation film on the mechanical displacement of a diaphragm portion can be alleviated so that the sensor with built-in circuits may be improved in the stability of the operation or characteristics.

5 Claims, 7 Drawing Sheets

SENSOR WITH BUILT-IN CIRCUITS AND PRESSURE DETECTOR USING THE SAME

This application is a continuation of application Ser. No. 09/501,292, filed Feb. 9, 2000, now abandoned.

BACKGROUND OF THE INVENTION

The present invention relates to a sensor with built-in circuits having a sensor region and circuit region provided on a semiconductor substrate, and to a pressure detector using the same.

There is a known pressure sensor with built-in circuits having provided on the same semiconductor substrate a sensor region for converting pressure into an electric signal, and a circuit region that is formed of a signal detection circuit for detecting the electric signal and a signal processing circuit for processing the electric signal, as disclosed in, for example, "An Integrated Silicon Bulk Micromachined Barometric Pressure Sensor for Engine control Unit and External Mount" (Motorola Semiconductor Application note (1998)).

In this conventional example, a piezo-electric resistance type pressure transducer having a piezo-electric resistance formed on a silicon diaphragm that is formed by etching a semiconductor substrate, and other elements such as operational amplifiers, active elements and passive elements including resistors for correction and compensation are formed on the same semiconductor substrate by a bipolar integrated circuit technology. An external pressure is exerted from below on the sensor.

SUMMARY OF THE INVENTION

Since a passivation film is not formed on the conventional sensor, the characteristics of the circuit elements may be fluctuated or deteriorated. The chief factors by which the characteristics are fluctuated or deteriorated will be moisture absorption and intrusion of mobile ions such as sodium or potassium ions.

Integrated circuits are normally passivated after deposition of metal wiring. The passivation film is a nitride film (CVD-SiN) that can be formed at a low temperature (~500° C.) by CVD (Chemical Vapor Deposition). The CVD-SiN film has features of excellent water resistance and that the diffusion speed of mobile ions in the nitride film is lower than that in the oxide film, and thus it is suitable for the passivation film.

The conventional sensor has its pressure receiving portion provided on the rear side. It is advantageous to provide it on the front side for low production cost and small-size chip. This front-side pressure-receiving type does not need the etching process in which the silicon substrate is etched to as deep as about 100 $\mu$m, and enables the diaphragm to be precisely controlled in its thickness by thin film technology such as CVD to form a thin film diaphragm which leads to a small-sized sensor. However, since the external pressure is exerted on the circuit portion of the front-side pressure receiving type, too, fluctuation or deterioration in the characteristics of the circuit elements are liable to occur as described previously. Particularly, when MOSs suitable for high-density integration are used as circuit elements, the fluctuation or deterioration in characteristics are more liable to occur than in the case in which bipolar elements are used as circuit elements, and thus the passivation film is absolutely necessary.

As described previously, the CVD-SiN film is suitable for the passivation film. However, the CVD-SiN film has a larger internal stress than the oxide film or polysilicon. In addition, the internal stress has a hysteresis characteristic, and it also fluctuates in a thermal cycle of about 100° C. Therefore, when the passivation film is simply deposited over the entire surface, the diaphragm is displaced by the change of internal stress in the CVD-SiN film, making the output characteristic of the pressure transducer unstable.

It is therefore an object of the invention to provide a sensor with built-in circuits capable of making stable operation or exhibiting stable characteristics by solving the above problems.

In a sensor with built-in circuits according to one aspect of the invention, a sensor region having a diaphragm portion, and a circuit region are provided adjacent to each other on a semiconductor substrate. The circuit region and sensor region are covered by a passivation film. An edge of the passivation film is located within the sensor region and between a side of the diaphragm portion and the circuit region. In other words, the sensor region is partially covered by the passivation film.

In the sensor with built-in circuits according to the invention, the sensor region and the circuit region are protected by the passivation film. In addition, since the sensor region is partially covered by the passivation film, the effect of the passivation film on the mechanical displacement of the diaphragm portion can be alleviated. Therefore, the sensor with built-in circuits can be improved in the stability of the operation or characteristics. To alleviate the effect of the passivation film on the diaphragm portion, the edge of the passivation film should preferably be provided closer to the circuit region rather than the side of the diaphragm portion, that is, it is preferable that the passivation film is not made in contact with the side of the diaphragm portion.

In another sensor with built-in circuits according to another aspect of the invention, similarly, a sensor region having a diaphragm portion, and a circuit region are provided adjacent to each other on a semiconductor substrate. In addition, a wiring conductor is provided to extend from the circuit region to within the sensor region and between a side of the diaphragm and the circuit region, and this wiring conductor and the circuit region are covered by a passivation film.

In the above sensor with built-in circuits according to the invention, the wiring conductor on the circuit region and sensor region is protected by the passivation film. Thus, the sensor with built-in circuits can be improved in the stability of the operation or characteristics.

In still another sensor with built-in circuits according to a further aspect of the invention, similarly, the sensor region having the diaphragm, and the circuit region are provided adjacent to each other on a semiconductor substrate. Moreover, the semiconductor substrate has a first region of a first-conductivity type and a second region of a second-conductivity type. The sensor region is provided in the first region, and the circuit region in the second region. Here, the first-conductivity and second-conductivity are opposite to each other, namely, either P-type and n-type, respectively, or n-type and p-type, respectively.

In the above sensor with built-in circuits according to the invention, the regions in which the sensor region and circuit region are provided on the semiconductor substrate are separated by a pn junction between the first and second regions. Thus, the sensor with built-in circuits can be improved in the stability of the operation or characteristics.

In each of the above sensors with built-in circuits, the sensor region may be a sensor of various kinds of which the output signal is changed by the mechanical displacement of the diaphragm portion. The circuit region may be circuits of various kinds including a signal detection circuit for detecting a signal from the sensor region, a signal processing circuit and a characteristic compensation circuit. The passivation film may be made of various kinds of material such as organic or inorganic materials. Particularly, if the passivation film made of an inorganic material, or silicon nitride film is used, the present invention has a great effect. For the stability of the operation or characteristics, it is preferable to cover the junction between the first and second regions by the passivation film or provide a wiring conductor for fixed potential made in contact with the surface of the second region or further cover this wiring conductor by the passivation film.

Sensors with built-in circuits according to the invention are particularly suitable to the cases such as when the diaphragm portion and the circuit elements within the circuit region are formed on the same surface side of the semiconductor substrate, or when the diaphragm portion receives a pressure on the surface side. Furthermore, a pressure detector stable in the operation or characteristics can be produced by housing each sensor with built-in circuits according to the invention within a package having a pressure introducing hole and by covering the sensor housed in the package with a gel material. When the diaphragm portion and the circuit elements within the circuit region are formed on the same surface side of the semiconductor substrate, or when the diaphragm portion receives a pressure on the surface side, the pressure introducing hole is provided in the surface side or is provided to face the surface side.

These and other features, and advantages, will be more clearly understood from the following detailed description taken in conjunction with the accompanying drawings.

DESCRIPTION OF THE PREFERRED EMBODIMENTS (First Embodiment)

Figure 1A:
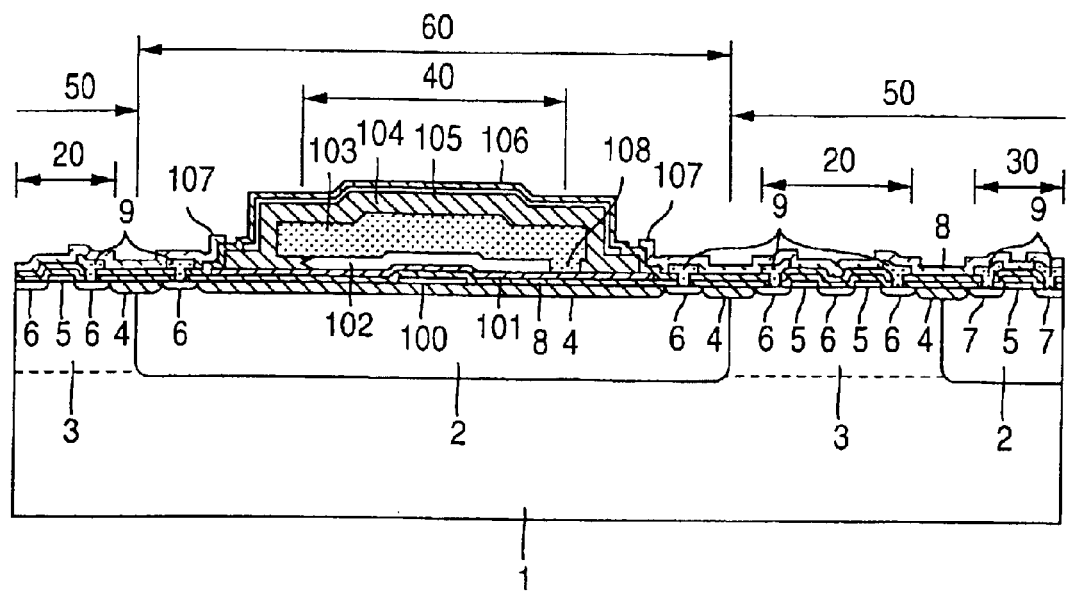
FIGS. 1A and 1B show a first embodiment of the invention.
Figure 1B:
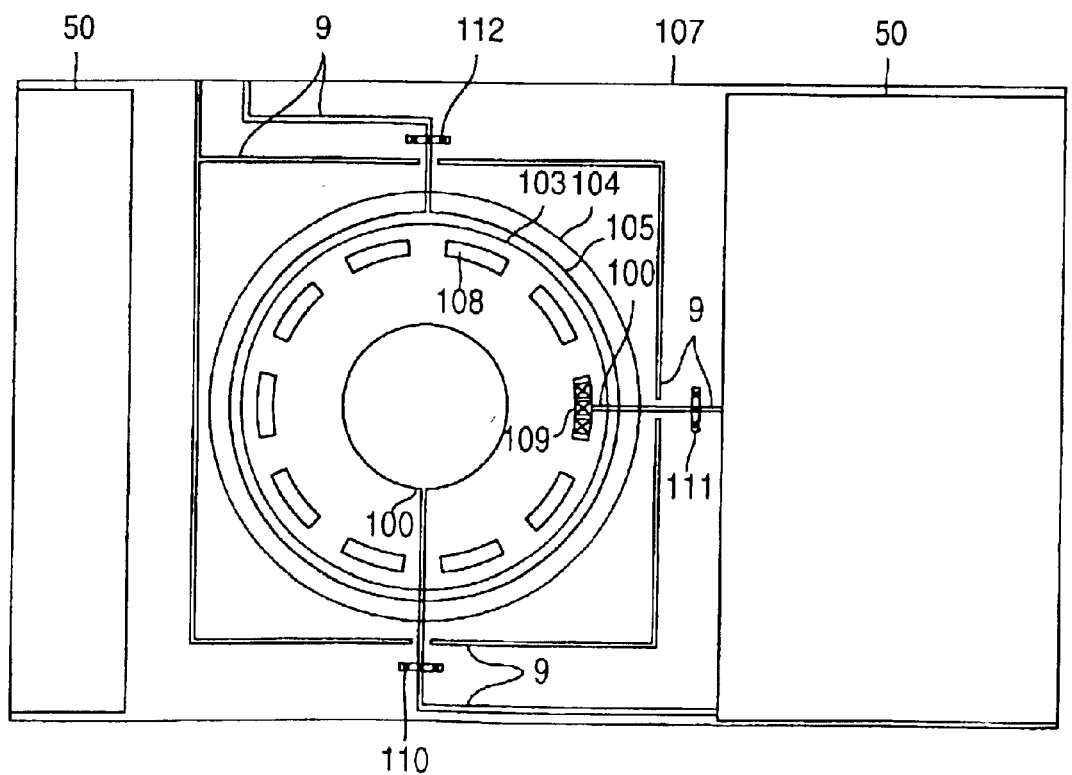

FIGS. 1A and 1B shows the first embodiment of the invention. FIG. 1A is a cross-sectional view thereof, and FIG. 1B is a plan view thereof.

Referring to FIGS. 1A and 1B, on a P-type semiconductor substrate there are formed an N-type diffusion layer 2, a P-type diffusion layer 3, and element separation regions electrically insulated by thermal oxide films 4. A $P^+$ diffusion layer 7 is formed within the N-type diffusion layer 2 to make a PMOS 30 together with a gate electrode 5. In addition, an $N^+$ diffusion layer 6 is formed within the P-type diffusion layer 3 to make an NMOS 20 together with the gate electrode 5. The PMOS 30 and NMOS 20 are connected by a metal wiring conductor 9 as required, making a circuit portion 50 such as circuits for signal detection and signal processing. Although not shown in FIGS. 1A and 1B, resistors and capacitors are formed at the same time as the above production process, if necessary.

Moreover, on the P-type semiconductor substrate 1 there are formed the following films, electrodes and diaphragm. A polysilicon 100 is formed on the thermal oxide film 4 in order to serve both as the lower electrode and as a wiring conductor. A cavity region 102 which is sealed to evacuate and the surface defined in the surface size by an anchor portion 108 is formed on the CVD oxide film 8 and CVD nitride film 101 that are interlayer insulating films. A diaphragm 40 is formed of a polysilicon 103 serving also as the upper electrode, CVD oxide film 104 serving also as the vacuum-sealing material, polysilicon 105 serving also as a shield electrode and CVD oxide film 106 serving also as an interlayer insulating layer. Thus, an electrostatic capacitance type pressure transducer 60 is built by those films, electrodes and diaphragm. The polysilicon 100 used as the lower electrode and a wiring conductor is connected to the wiring conductor 9 through a contact portion 110. The polysilicon 103 serving as the upper electrode is connected to the polysilicon 100 through a contact portion 109. The polysilicon 100 and the metal wiring conductor 9 are also connected at a contact portion 111. The polysilicon 105 serving as a shield electrode and wiring conductor is connected to the metal wiring conductor 9 through a contact portion 112.

A passivation film 107 is formed over the entire region of the circuit portion 50 except the bonding pads, and on part of the static capacitance type pressure transducer 60 not to be made in contact with, at least the diaphragm 40 and the side of the diaphragm 40. Here, the passivation film 107 is desired to be of CVD-SiN that is excellent in moisture resistance and movable ion resistance. Since the passivation film 107 is not formed over the top and side of the diaphragm 40, the CVD oxide film 106 should preferably be formed closely at a temperature of 700° C. or above so that the impurity concentration is 1 mol. % or less and that the moisture absorption is small.

The passivation film 107 is not simply deposited on the circuit portion 50, but rather it should be formed as close to the diaphragm 40 as possible. The individual elements within the integrated circuit are electrically separated but connected by wiring conductors to form circuits. Since the pressure transducer 60 in the integrated pressure sensor of this embodiment is also one element, the elements are required to be electrically separated from the circuit portion except the necessary wiring conductor layers. In this embodiment, the elements are electrically separated by a junction between the N-type diffusion layer 2 and P-type diffusion layer 3. If the passivation film 107 is deposited only on the circuit portion 50, but not on the pressure transducer 60, the passivation film 107 is not formed at around the PN junction, and the metal wiring conductor layer 9 for the fixed potential of the N-type diffusion layer 2 is exposed to the outside. Accordingly, it is liable that the junction separation characteristic deterioration such as an increase in leakage current and deterioration of junction breakdown voltage and the corrosion of metal wiring conductor layers may easily occur. Therefore, the passivation film 107 is desired to cover the metal wiring conductor layers. In addition, the opening or aperture is required to be distant enough from the junction separation position according to the environment in which the product is used.

Figure 2A:
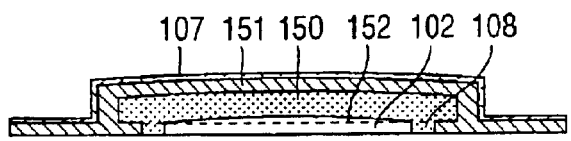
FIGS. 2A–2D are diagrams useful for explaining effects of the passivation film on the diaphragm.
Figure 2B:
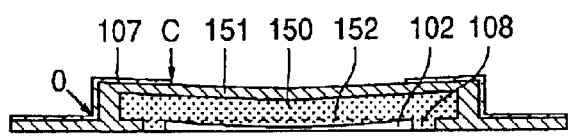

The position of the edge of the passivation film 107 in this embodiment will be described with reference to FIGS. 2A–2D. FIGS. 2A–2D are diagrams for explaining the effect of the passivation film 107 on the diaphragm having a compression stress. Referring to FIGS. 2A and 2B, there is shown a first diaphragm constituting film 150 which corresponds to reference numeral 103 in FIG. 1 of this embodiment. Shown at 151 is a second diaphragm constituting film which corresponds to reference numerals 104–106 in FIG. 1 of this embodiment. Shown at 108 is the anchor portion, 102 the cavity region, and 107 the passivation film. In addition, shown at 152 is an ideal diaphragm position where the pressure within the cavity region 102 is equal to the external pressure, or the state in which the diaphragm is not displaced at all. FIG. 2A shows the case when the passivation film 107 is deposited over the whole diaphragm, and FIG. 2B shows the case when the passivation film 107 is deposited up to the inner side of the anchor portion. In other words, as illustrated in FIG. 2B, the electrostatic capacitance type pressure transducer 60 acting as a sensor region is partially covered by the passivation film 107. In the case of FIG. 2A, since an expanding force is exerted according to the compression stress, the diaphragm is curved up. In the case of FIG. 2B, the same force is exerted, but the acting range of the force is between points O and C on the diaphragm since the passivation film has an opening. Therefore, in the case of FIG. 2B, the compression stress in the passivation film acts to depress the diaphragm, with the result that the diaphragm is warped down. When the passivation film 107, particularly CVD-SiN is formed on the diaphragm, the diaphragm is warped by the internal stress of the film. The internal stress in the CVD-SiN changes from the compression stress to the tensile stress depending on the CVD apparatus and deposition conditions, and ranges to a few giga Pa.

Figure 2C:
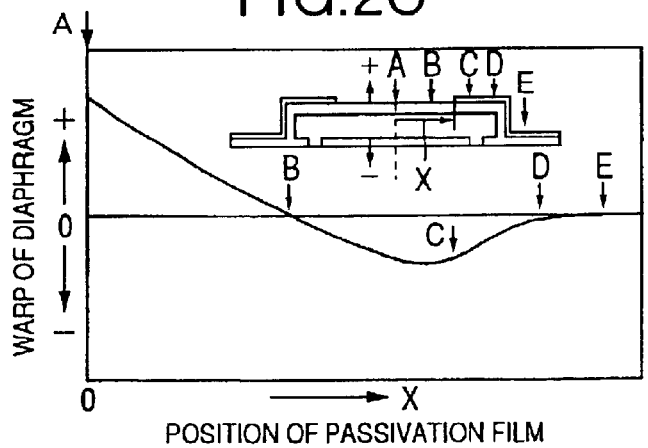

Although the force in the radius direction is given in FIGS. 2A and 2B, the same force is actually exerted in the circumferential direction. Thus, if the opening is provided in the passivation film, the diaphragm is not always warped down, but depends upon where the passivation film is formed. FIG. 2C shows the relation between the position up to which the passivation film is formed and the amount of warp of the diaphragm in the case when the passivation film has a compression stress. The up warp of the diaphragm is expressed by plus + and the down warp thereof by minus –. The position up to which the passivation film is formed is expressed by the distance X from the diaphragm center in the direction of the outer periphery. In FIG. 2C, the position A is X=0, or when the passivation film is formed over the whole diaphragm, position B is intermediate between the diaphragm center and the anchor portion, position C is inside the anchor, position D is outside the anchor portion and on the first diaphragm constituting film 150, and position E is outside the first diaphragm constituting film 150 and not made in contact with the side of the second diaphragm constituting film 151 that covers the side of the first diaphragm constituting film 150. In other words, the edge of the passivation film 107 extending or spreading from the circuit portion 50 as a circuit region to the electrostatic capacitance type pressure transducer 60 as a sensor region is located differently at positions A–E. At position A, the edge of the passivation film is at the center of the diaphragm, and thus there is no edge. At positions B, C and D, the edge of the passivation film is between the diaphragm center and the anchor portion. In the interval between D and E, the edge of the passivation film is between the side of the diaphragm portion within the sensor region and the circuit region. At position E, the edge is on the circuit region side separated from the side of the diaphragm portion. That is, as we goes from A to E, the region in which the passivation film is not formed spreads the more. The diaphragm warps up at A, and warps down outside the position B as described above. From FIG. 2C, it will be seen that the diaphragm hardly warps at position B or outside the position E. However, the internal stress is changed by thermal cycle, thus disturbing those passivation film edge positions where the diaphragm cannot be warped. Therefore, in order to prevent the diaphragm from being warped by the passivation film, it is necessary to locate the edge of the passivation film outside the position D, preferably outside the position E.

Figure 2D:
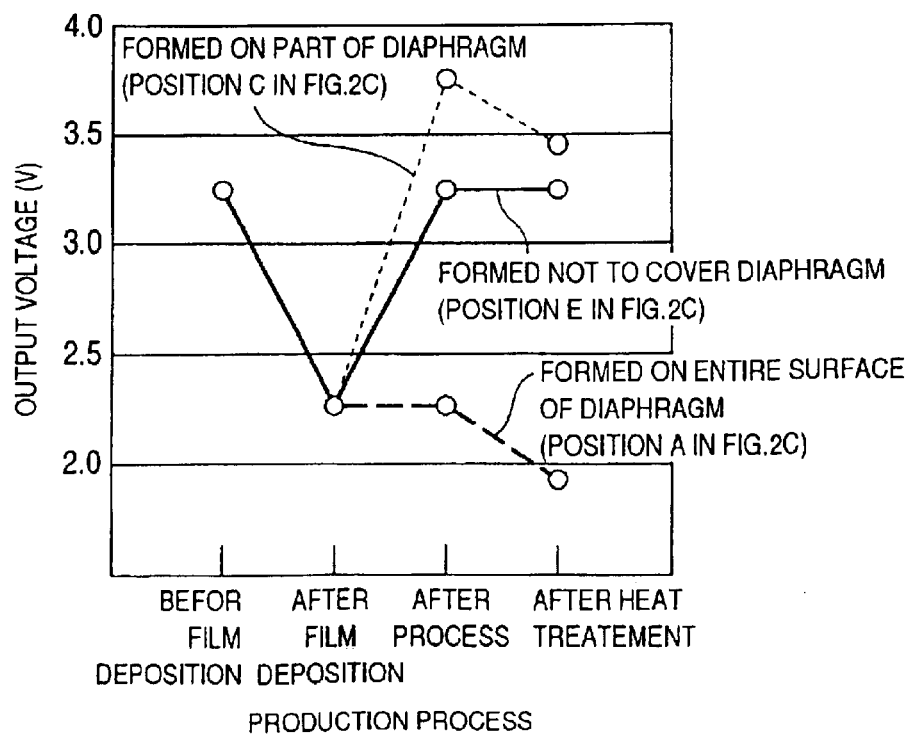

FIG. 2D is a graph showing the relations between the pressure transducer output and the production process with the passivation film edge changed. The production process of the graph includes the steps of "before film deposition" which means that the passivation film is not formed yet, "after film deposition" which means that the passivation film has been formed over the entire surface of the semiconductor substrate, "after process" which means that the passivation film formed on the pressure transducer has been partially etched away, and "after heat treatment" which means that the passivation film has been annealed in nitrogen atmosphere. The "output voltage" of the ordinate is the voltage into which the electrostatic capacitance between the upper and lower electrodes has been converted. The circuit arrangement is such that when the diaphragm is warped up (the distance between the upper and lower electrodes increases, thus the capacitance being decreased), the output voltage decreases, and that when the diaphragm is warped down (the distance between the upper and lower electrodes decreases, thus the capacitance being increased), the output voltage increases.

From the graph, it will be seen that after film deposition the output voltage is decreased, as compared with that before film deposition, by the compression stress in the passivation film so that the diaphragm is warped down. In addition, after process the output voltage is changed by the passivation edge position. When the passivation film is deposited over the entire surface of the diaphragm (position A in FIG. 2C), or when the passivation film is not etched, the output voltage is equal to that after film deposition. When the passivation film is formed on part of the surface of the diaphragm (position C in FIG. 2C), the output voltage is higher than that before film deposition. This means that the diaphragm is warped down as compared with that before film deposition. On the other hand, when the passivation film is formed not to cover the diaphragm at all (position E in FIG. 2C), the output voltage is just the same as that before film deposition. This means that the warp of the diaphragm is equal to that before film deposition. Moreover, the output voltage after heat treatment is decreased when the passivation film edge is at position A in FIG. 2C, and when the passivation film is etched away up to position C in FIG. 2C. It will be understood that the diaphragm is warped down by the increase of internal stress in the passivation film. When the passivation film is etched away up to position E in FIG. 2C, the output voltage becomes stable as illustrated, and thus the warp of the diaphragm is unchanged as compared with that before film deposition.

The manufacturing method of this embodiment will be described with reference to FIGS. 3A–3F.

Figure 3A:
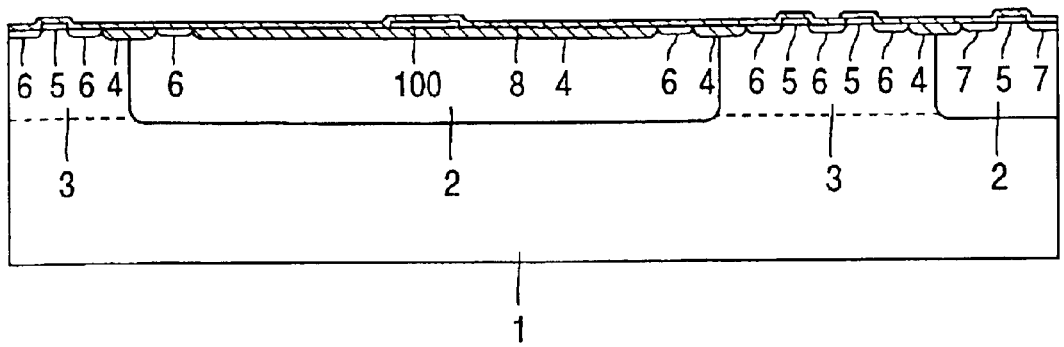
FIGS. 3A–3F show a production method for the first embodiment.

First as illustrated in FIG. 3A, circuit elements such as CMOSs, resistors and capacitors, polysilicon 100 as the lower electrode of the pressure transducer, and CVD oxide film 8 as an interlayer insulating film are formed on the P-type semiconductor substrate 1 by the normal CMOS production process. In this embodiment, while the polysilicon 5 for the gate electrode and the polysilicon 100 as the lower electrode of the pressure transducer are formed common to each other for shorting the process, those layers may be formed separately.

Figure 3B:
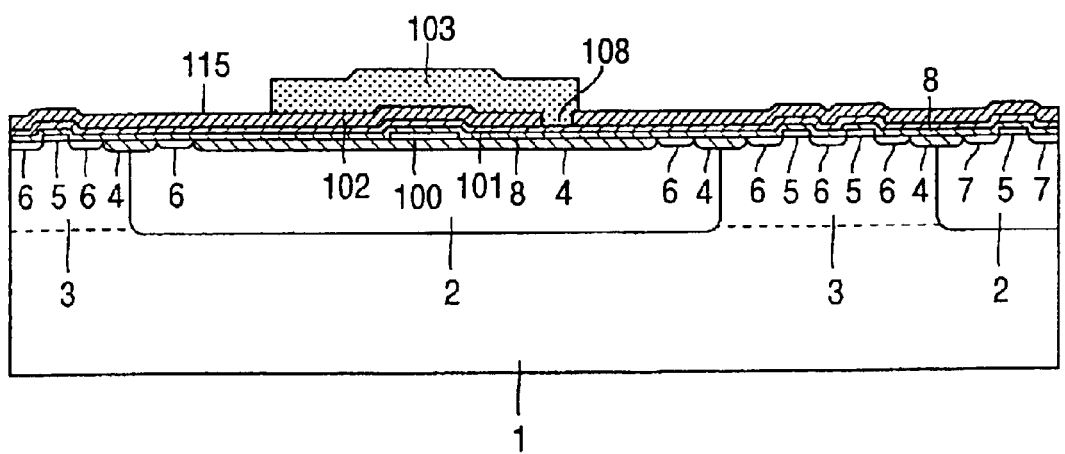

As illustrated in FIG. 3B, the CVD nitride film 101 and CVD oxide film 115 are deposited thereon. Then, the anchor portion 108 is formed by etching, and polysilicon is deposited thereon by CVD and photo-etched to form the polysilicon 103 as the diaphragm constituting film and as the upper electrode. Here, although the polysilicon 103 may be a single layer or a laminated film formed after depositing a plurality of times, the upper layer opposed to the lower electrode 100 should be doped with an impurity of at least $1E19/cm^3$ or above.

Figure 3C:
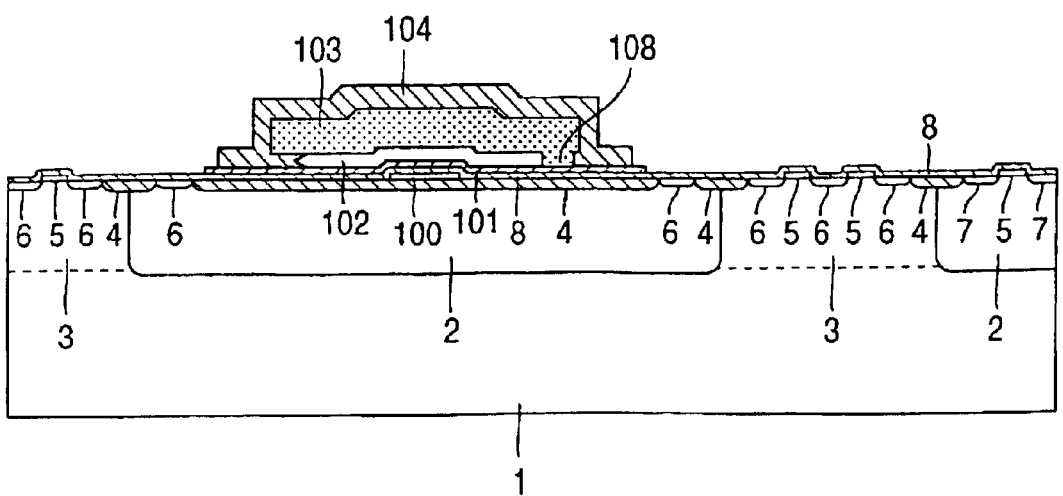

As shown in FIG. 3C, the CVD oxide film 115 is etched with fluorine acid. Thus, the CVD oxide film 115 should be selected to be, for example, high-concentration PSG or BPSG that has a large etch rate against fluorine acid. Conversely, the CVD nitride film 101 is required to have a small etch rate against fluorine acid because it is a barrier material for protecting the lower layers. Thus it should be formed at a temperature of 700° C. or above. Then, a CVD oxide film is deposited to form the cavity region 102, and the CVD oxide film 104 is formed as a diaphragm constituting film and hermetic sealing material by photo-etching. Here, the CVD oxide film 104, which is a hermetic sealing material and thus close, should be formed under film forming conditions providing a poor step coverage in order to secure the lateral size of the cavity region 102. In addition, the CVD nitride film 101 as a etching barrier material against fluorine acid is not suitable for the interlayer insulating film because it is liable to cause charge-up. Thus, the CVD nitride film should be removed as much as possible.

Figure 3D:
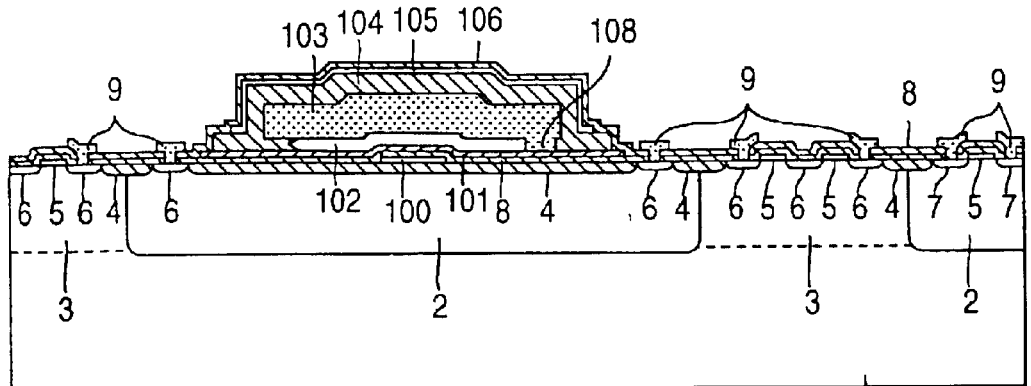

As shown in FIG. 3D, polysilicon is deposited by CVD, and photo-etched to form the polysilicon 105 as a diaphragm constituting film and shield electrode. The polysilicon 105 for shield electrode serves to prevent external electrical noise and contaminant from entering into the pressure transducer. Then, the CVD oxide film 106 is formed as a diaphragm constituting film and interlayer insulating film. Thereafter, the metal wiring conductor layer 9 is formed thereon after contact holes are bored in the insulating layer.

Figure 3E:
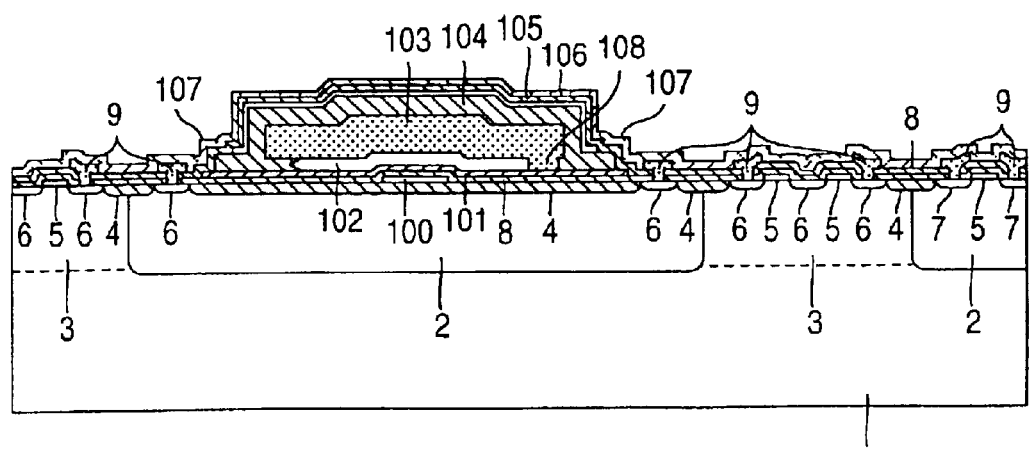

As illustrated in FIG. 3E, the passivation film 107 is deposited thereon. Here, the passivation film 107 is desired to be CVD-SiN that is formed by ECR (Electron Cyclotron Resonance)-CVD or plasma-CVD and that is excellent in moisture resistance and movable ion resistance.

Figure 3F:
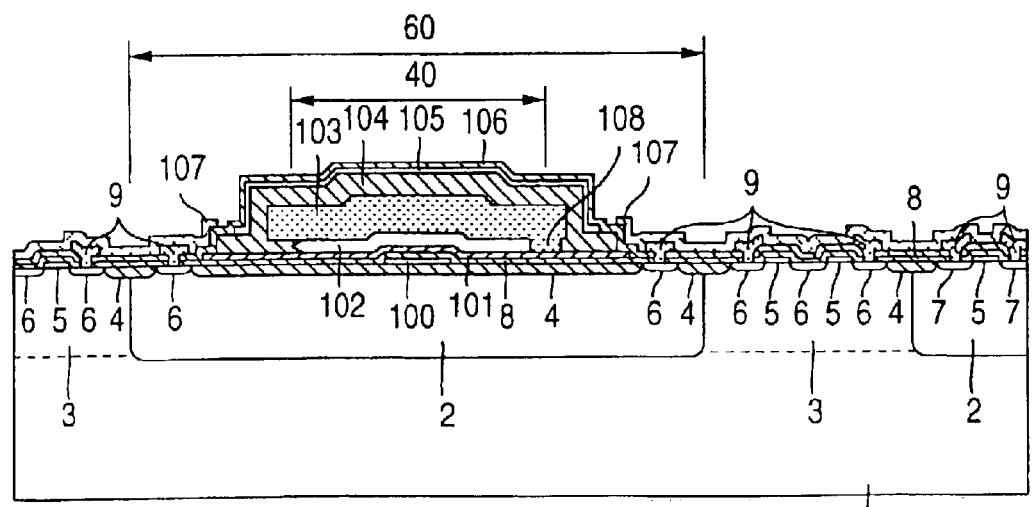

As shown in FIG. 3F, the passivation film 107 is partially removed by photo-etching so that the passivation film is not made in contact with at least the top and side of the diaphragm 40 of the pressure transducer 60. Thus the pressure sensor of this embodiment is completed.

Examples of mounting this embodiment will be described with reference to FIGS. 4 and 5.

Figure 4:
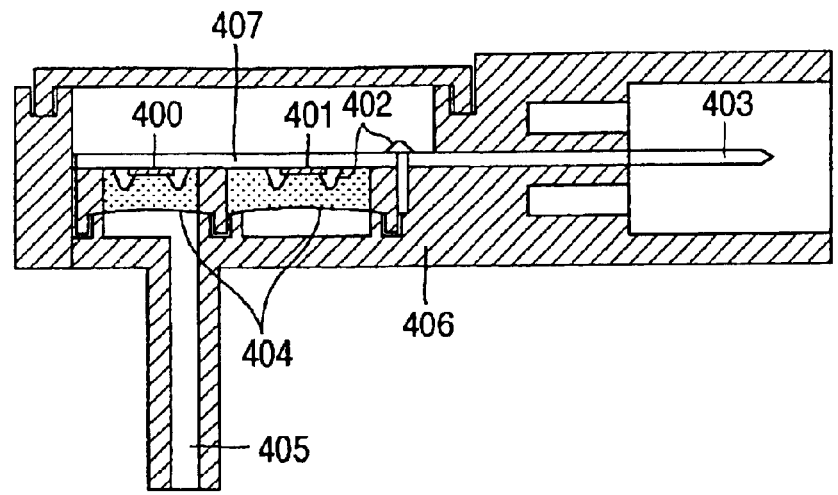
FIG. 4 shows an example of a pressure sensor according to the first embodiment.

Referring to FIG. 4, a pressure sensor chip 400 is securely mounted on a metal-wiring board 407 and electrically connected by metal wire 402 to the conductors of the board 407. Silicon gel 404 is coated thereon to protect the surface and prevent contaminant from entering into the chip. The board with the chip mounted and coated is securely mounted within a plastic package 406. Shown at 401 is a signal processing chip for correcting the characteristics. This signal processing chip is mounted in the similar manner to the pressure sensor chip 400.

An external pressure is exerted on the pressure sensor chip 400 through a pressure introducing hole 405. The pressure sensor chip 400 converts the pressure into an electrical signal, and amplifies the signal. The signal processing chip 401 corrects the characteristics and sends the signal through a terminal 403 to the outside.

Figure 5:
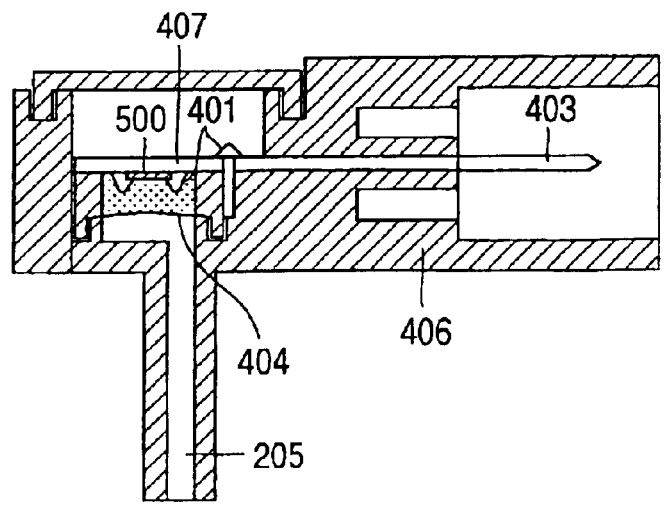
FIG. 5 shows another example of a pressure sensor according to the first embodiment.

FIG. 5 is another example of mounting the chip. The function of the signal processing chip for correcting the characteristics is added to the pressure sensor, 500 by on-chip mounting. Thus, small size and low cost can be achieved by the unitary single chip.

Thus, according to this embodiment, since the passivation film is formed on the signal detecting circuit and signal processing circuit, the characteristics of the circuit elements can be prevented from being changed or deteriorated. In addition, since the passivation film is formed not to be made in contact with at least the top and side of the diaphragm of the pressure transducer, the pressure transducer is able to produce stable output characteristics. Therefore, a high-performance, high-reliability pressure sensor can be provided.

(Second Embodiment)

Figure 6:
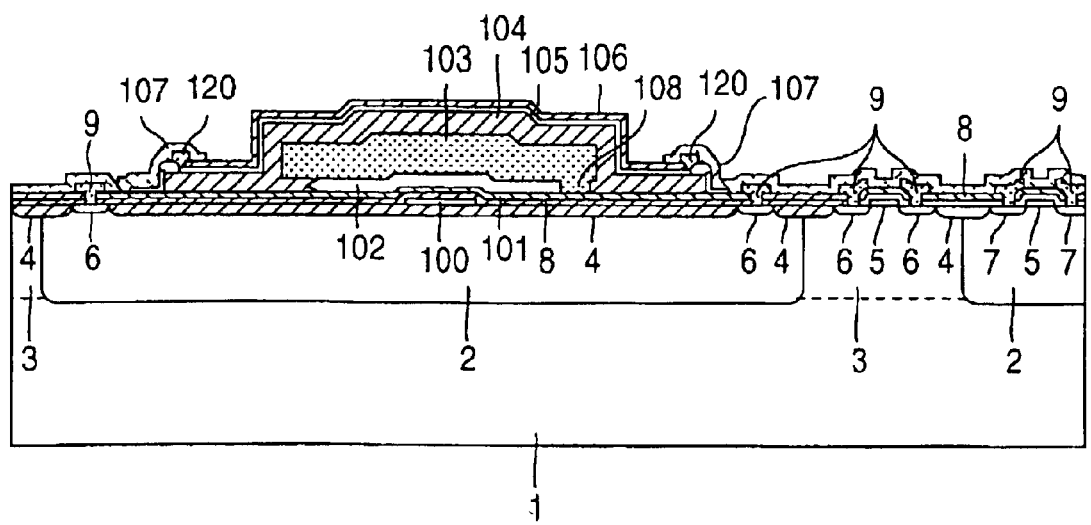
FIG. 6 is a cross-sectional view of a second embodiment of the invention.

FIG. 6 is a cross-sectional view of the second embodiment according to the invention. In this embodiment, the polysilicon 105 as the shield electrode has its outer periphery all connected to a metal wiring conductor 120, and the passivation film 107 is formed to cover the metal wiring conductor 120. The potential of the metal wiring conductor 120 and polysilicon 105 is fixed to a power supply voltage or ground potential. Therefore, moisture and contaminant can be suppressed from entering through the opening of the passivation film, and thus the pressure sensor is more reliable.

(Third Embodiment)

Figure 7:
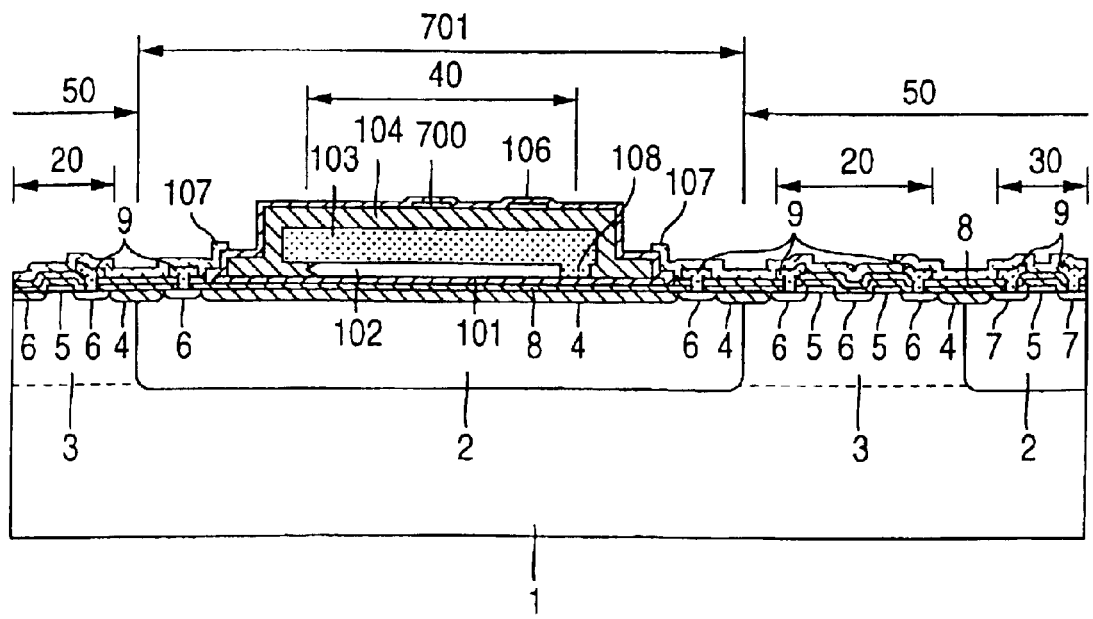
FIG. 7 is a cross-sectional view of a third embodiment of the invention.

FIG. 7 is a cross-sectional view of the third embodiment according to the invention. In this embodiment, 700 represents a polysilicon resistor, and 701 a piezo-electric resistance type pressure transducer for detecting the pressure from the resistance change of the polysilicon resistor 700. This embodiment is an integrated pressure sensor having the piezo-electric resistance type pressure transducer 701, signal detection circuit and signal processing circuit built on the P-type semiconductor substrate 1. Since the resistance change of the polysilicon resistor 700 is determined by the displacement of the diaphragm 40, it is important to control the warp of the diagram 40 as is similar to the first embodiment.

According to this embodiment, since the passivation film is formed on the signal detection circuit and signal processing circuit, the characteristics of circuit elements can be prevented from being changed or deteriorated. In addition, since the passivation film is formed not to be made in contact with at least the top and side of the diaphragm of the piezo-electric resistance type pressure transducer 701, the pressure transducer is able to produce output of stable characteristics.

(Fourth Embodiment)

Figure 8:
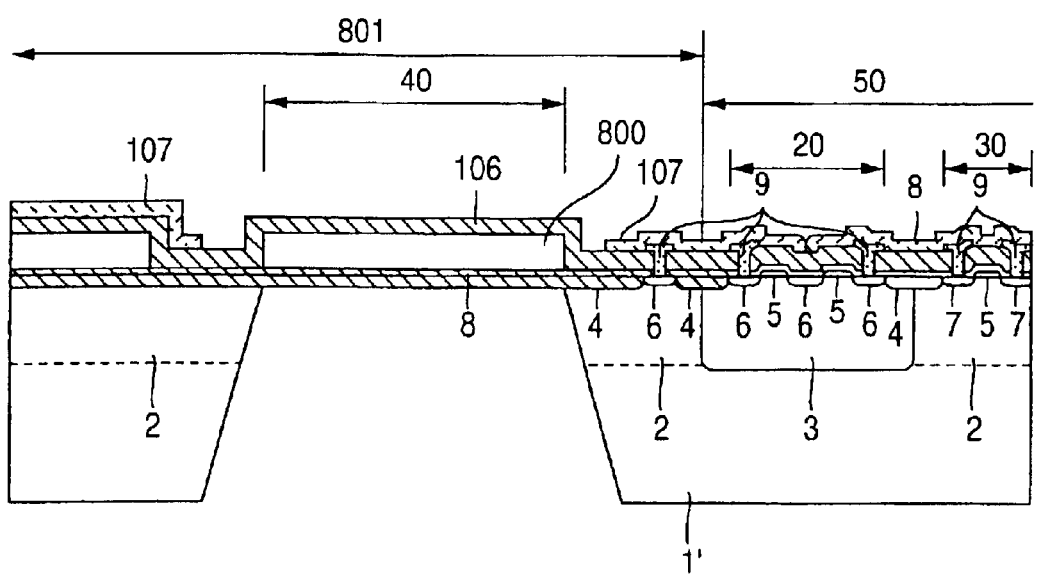
FIG. 8 is a cross-sectional view of a fourth embodiment of the invention.

FIG. 8 is a cross-sectional view of the fourth embodiment according to the invention. In this embodiment, 800 represents a polysilicon resistor, and 801 a flow transducer for detecting air flow from the change of current flowing in the polysilicon resistor 800 so that the temperature of polysilicon resistor 800 can be maintained constant. This embodiment is an integrated flow sensor having the flow transducer 801, signal detection circuit and signal processing circuit formed on an N-type semiconductor substrate 1'. If the warp of diaphragm 40 is not stabilized, the resistance value of the polysilicon resistor 800 changes with the result that the amount of heat generated per unit current changes. Or the cooling characteristic of the polysilicon resistor 800 is changed by the change of the diaphragm shape.

According to this embodiment, since the passivation film is deposited on the signal detection circuit and signal processing circuit, the characteristics of circuit elements can be prevented from being changed or deteriorated. In addition, since the passivation film is formed not to be made in contact with at least the top and side of the diaphragm of the flow transducer, the diaphragm can be prevented from being warped, and the flow transducer is able to produce output of stable characteristics. Thus, the present invention can provide a high-performance, high-reliability flow sensor.

According to the embodiments, the operation or characteristics of the sensor with built-in circuits can be stabilized.

What is claimed is:

1. A sensor with built-in circuits comprising:
   a sensor region provided on a semiconductor substrate and having a diaphragm portion; and
   a circuit region provided on said semiconductor substrate so as to be adjacent to said sensor region, wherein
   a silicon nitride passivation film is formed to cover said circuit region and so that an edge of said passivation film is located in said sensor region and between a side of said diaphragm portion and said circuit region without contacting said diaphragm portion.

2. A sensor with built-in circuits according to claim 1, wherein said passivation film is a silicon nitride film.

3. A sensor with built-in circuits according to claim 1, wherein said diaphragm portion and circuit elements within said circuit region are located on the same surface side of said semiconductor substrate.

4. A sensor with built-in circuits according to claim 3, wherein said diaphragm portion receives a pressure on said surface side.

5. A pressure detector comprising:
   a sensor with built-in circuits having a sensor region provided on a semiconductor substrate and including a diaphragm portion, and a circuit region provided on said semiconductor substrate so as to be adjacent to said sensor region, wherein a silicon nitride passivation film is formed to cover said circuit region and an edge of said passivation film is located within said sensor region and between a side of said diaphragm portion and said circuit region without contacting said diaphragm portion and, said diaphragm and circuit elements within said circuit region are located on the same surface side of said semiconductor substrate;
   a package housing said sensor and having a pressure introducing hole located on said surface side; and
   a gel material provided within said package to cover said sensor.

* * * * *